United States Patent [19]
Sukegawa et al.

[11] Patent Number: 5,636,329
[45] Date of Patent: Jun. 3, 1997

[54] LIQUID CRYSTAL DISPLAY APPARATUS HAVING TERMINAL PROTECTED FROM BREAK DOWN

[75] Inventors: Osamu Sukegawa; Takahiko Watanabe; Wakahiko Kaneko, all of Tokyo, Japan

[73] Assignee: NEC Corporation, Tokyo, Japan

[21] Appl. No.: 493,537

[22] Filed: Jun. 22, 1995

[30] Foreign Application Priority Data

Jun. 23, 1994 [JP] Japan .................... 6-163337

[51] Int. Cl.$^6$ .................................... G02F 1/1343
[52] U.S. Cl. .................................... 349/149
[58] Field of Search .................... 359/88, 85, 83

[56] References Cited

U.S. PATENT DOCUMENTS 5,187,604   2/1993  Taniguchi et al. .................... 359/88
5,311,341   5/1994  Hirai .................................... 359/88

FOREIGN PATENT DOCUMENTS

64-19324   1/1989  Japan .................................... 359/88
4-32821    2/1992  Japan .

*Primary Examiner*—William L. Sikes
*Assistant Examiner*—James A. Dudek
*Attorney, Agent, or Firm*—Young & Thompson

[57] ABSTRACT

A lower layer metal wiring is led out from a display portion to a terminal portion provided to the periphery of the glass substrate and covered at the upper surface with an interlayer insulation film. An upper layer metal wiring formed on the interlayer insulation film is connected to the lower layer metal wiring by way of contact holes formed in the interlayer insulation film. The upper layer metal wiring is completely covered by the transparent conductive film. A protective insulation film is formed on the transparent conductive film, and an opening is made in to the protective insulation film in the terminal portion. In the terminal portion, copper foil wirings of a flexible wiring substrate are connected by way of an anisotropic conductive film. The upper layer metal wiring is removed at a portion not protected by the protective insulation film or the anisotropic conductive film.

14 Claims, 6 Drawing Sheets

LIQUID CRYSTAL DISPLAY APPARATUS HAVING TERMINAL PROTECTED FROM BREAK DOWN

BACKGROUND OF THE INVENTION

1. Field of the Invention

The present invention relates to a liquid crystal display apparatus and, more particularly, to an improvement in active matrix substrate employed in such an apparatus.

2. Description of the Related Art

A liquid crystal display apparatus or device has been generally used in various fields such as office automation equipment, car-mounted equipment and measuring instruments, since the device has a feature of less consuming electric power and space saving. Among all, an active matrix type device has attracted attention as a display means capable of full color display and realizing high contrast and high refinement.

The active matrix type liquid crystal display device includes an active matrix substrate provided with a plurality of pixels each having a switching element such as a thin film transistor. It is necessary to connect the substrate to a driver integrate circuit (IC). While various kinds of connection structures have been proposed, such a structure is generally employed that connecting terminals on the substrate are bonded by way of an anisotropic conductive film (ACF) to a tape-carrier package (TCP) having the driver IC.

In such a structure, the terminal portion for connection is made of a metal wiring layer covered with a chemically stable transparent conductive film, and a part of the transparent conductive film is attached or bonded to the anisotropic conductive film. The portion of the conductor portion of the terminal not bonded with the anisotropic conductive film is used as a checking terminal to check the electrical connection between the terminal of the tape-carrier package. That is, a measuring probe is applied to the conductor portion so as to check whether or not the tape-carrier package and the terminal are electrically connected.

Since the transparent conductive film covering the metal wiring is composed of a metal oxide, it cannot be formed thick in view of insuring transparency, so that there may exist some pin-holes in the transparent conductive film. For this reason, the metal wiring is subject to an atmosphere through the pin-poles, so that there occurs corrosion on the wiring. Further, even if there is no defect, the metal wiring also suffers from corrosion due to moisture permeating the transparent conductive film in a high temperature and high humidity atmosphere. As the corrosion proceeds, the wiring is disconnected or broken out finally.

As a countermeasure against the moisture, the exposed portion at the terminal portion is considered to be covered with a silicone resin thereby providing shield from the external moisture. Although this can suppress corrosion in the metal wiring, it requires an additional step of coating the silicone resin resulting in increase in cost. Alternatively, the terminal portion of the active matrix substrate may be completely covered with the anisotropic conductive film. In this case, the corrosion of the wiring can be suppressed even without coating the silicone resin. However, this results in a disadvantage that checking the connection between the carrier package and terminal portion is impossible because the measuring probe can not be applied to the conductor portion of the terminal portion.

SUMMARY OF THE INVENTION

It is, accordingly, an object of the present invention to provide a liquid crystal display apparatus having a terminal portion capable of preventing corrosion of a wiring layer without increasing the number of steps and without hindering the checking function during the steps.

In order to attain the foregoing object, a liquid crystal display apparatus according to the present invention has a plurality of terminals each including a conductor film, a transparent conductive having a first portion formed on the conductor film and a second portion extending from the first portion, and a protection film covering a part of the second portion of the transparent conductive film with leaving a remaining part of the second portion, the first portion being attached to a connection member to receive driving signals.

In the constitution described above, the portion of the conductor film of the transparent conductive film except the above part is protected by the protection film and the connection member such as anisotropic conductive film or heat seal connector. The above part is used for a check pad. Accordingly, even if the transparent conductive film contains a defect or even if it is used in a high temperature and high humidity atmosphere, the conductor film is free from the effects of external atmosphere. The conductor film is thus protected from the wiring against corrosion. Therefore, according to the present invention, reliability of the terminal portion can be improved without adding steps. Then, according to the present invention, since checking after connection with the driver circuit is possible at the terminal portion and the silicone resin coating step after the press bonding step of the driver circuit can be saved, it is possible to increase the productivity and reduce the cost of the liquid crystal display device.

BRIEF DESCRIPTION OF THE DRAWINGS

The above and other objects, features and advantages of the present invention will be more apparent from the following description taken in conjunction with the accompanying drawings, in which.

DETAILED DESCRIPTION OF THE PREFERRED EMBODIMENTS

Prior to the description of the preferred embodiments according to the present invention, the prior art will be explained more specifically with reference to the drawings in order to facilitate understanding of the present invention.

Figure 1A:
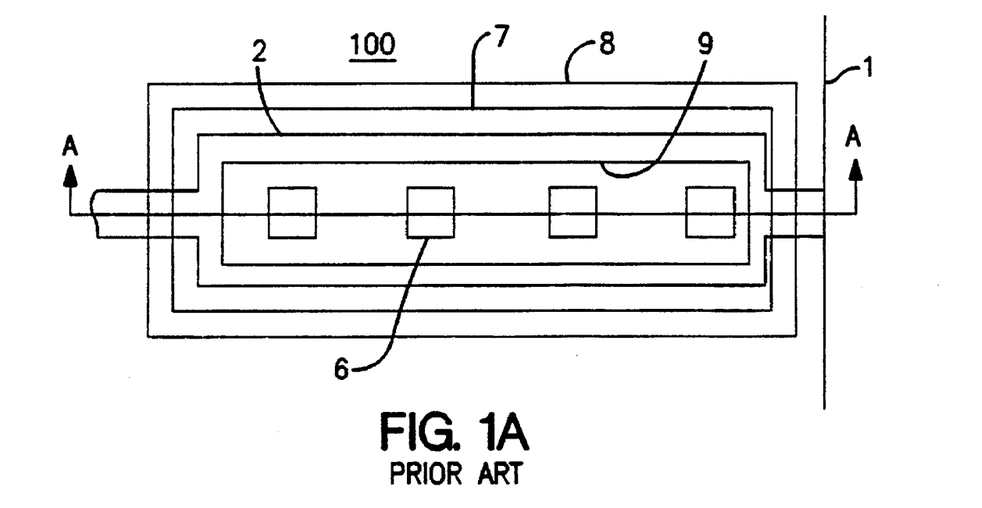
FIG. 1(a) and FIG. 1(b) are, respectively, a plan view and a cross sectional view taken along line A—A for a terminal portion of the prior art.
Figure 1B:
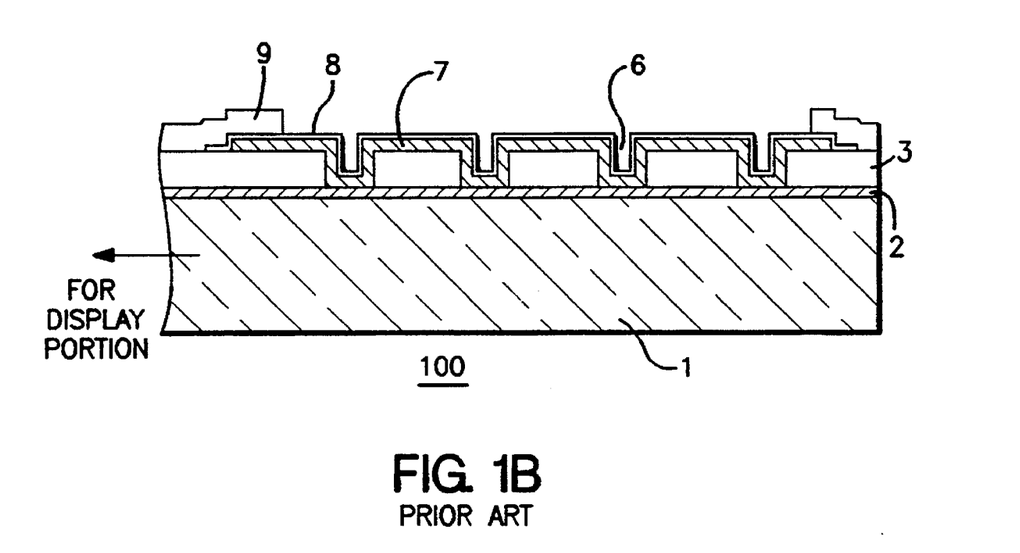

Referring to FIG. 1(a) and FIG. 1(b), a terminal portion according to the prior art includes a glass substrate 1, a lower layer metal wiring 2 made of Cr or the like, an interlayer insulating film 3 comprising a composite film of a silicon oxide film and a silicon nitride film, contact holes 6 formed in the interlayer insulation film 3 to expose a plurality of portion of the lower layer metal wiring 2, an upper layer metal wiring 7 made of Cr or the like formed on the film 3 in contact with the respective portions of the wiring 2, a transparent conductive film 8 made of Indium-Tin-Oxide (ITO) and a protective insulating film 9 made of a silicon nitride film.

As is apparent from FIG. 1(a) and FIG. 1(b), the upper layer metal wiring 7 in a terminal portion is completely covered with the transparent conductive film 8. Although only one terminal is illustrated in the figure, several hundreds of terminals are actually disposed on the substrate 1 in the vertical direction of FIG. 1(a).

Figure 2A:
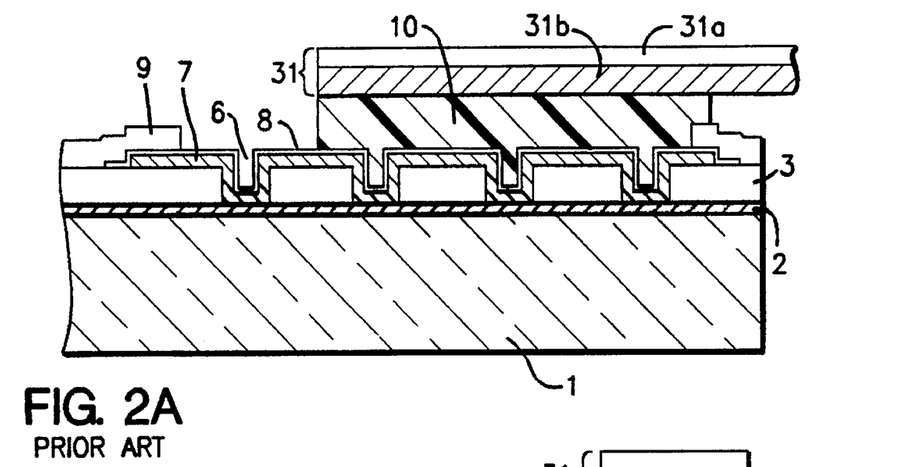
FIG. 2(a) to FIG. 2(c) are cross sectional views for explaining problems in the terminal portion of the prior art.

Turning to FIG. 2(a), a terminal portion of a tape-carrier package is connected to the terminal portion of the prior art shown in FIG. 1(a) and FIG. 1(b). Specifically, a copper foil wiring 31b of a flexible wiring substrate 31 constituting the tape-carrier package is connected by way of an anisotropic conductive film 10 onto the terminal portion 100. A conductor portion of the terminal portion 100 not covered with the anisotropic conductive film 10 is used as a checking terminal to check electrical connection between the terminal 100 and the tape-carrier package.

Figure 2B:
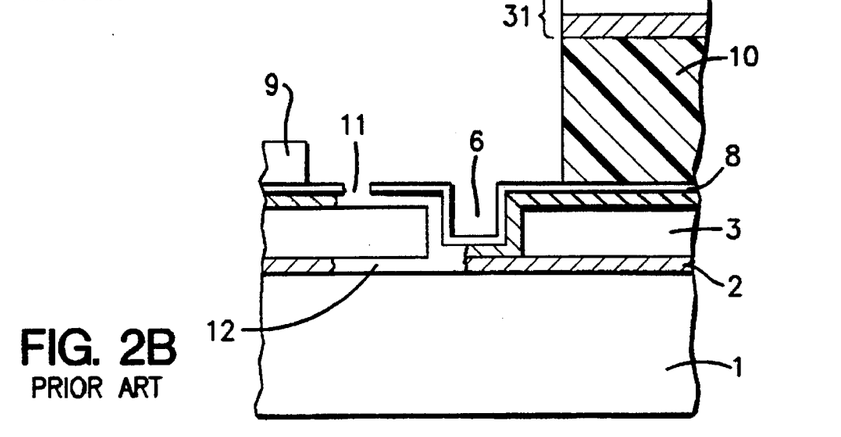

Since the transparent conductive film 8 covering the metal wiring 7 is made of ITO, it is chemically stable by itself. However, since it has not so preferred moisture resistant function and can not be formed to a large film thickness in view of ensurance of transparency, the protective function to the metal wiring 7 is not so effective. For instance, as shown in FIG. 2(b), if a defect 11 such as a pin-hole is present in the transparent conductive film 9, the metal wiring 7 is exposed to an external atmosphere to result in corrosion portion 12. Further, even if there is no defect, the metal wiring 2 also suffers from corrosion due to moisture permeating the transparent conductive film in a high temperature and high humidity atmosphere. If corrosion proceeds, the wiring can become completely disconnected, so that a control signal from a driver IC provided on the tape-carrier can not be transmitted from the terminal portion to the display portion.

Figure 2C:
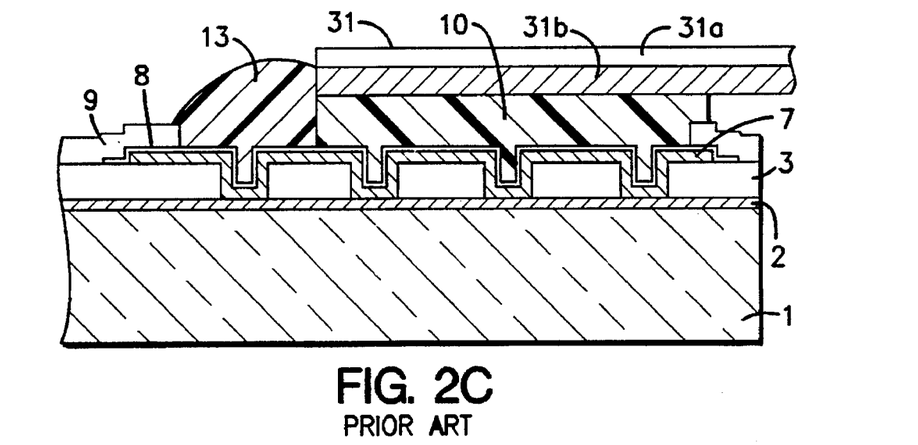

As a countermeasure, as shown in FIG. 2(c), it may be considered to cover the exposed portion of the terminal portion with a silicone resin 13 thereby providing shield for the exposed portion against external effects. However, in the prior art shown in FIG. 2(c), since a step of coating the silicone resin 13 is required, this results in increase in cost.

Further, it has been proposed in Japanese Laid-Open Patent No. Hei 4-32821 to completely cover an entire terminal portion with a heat seal connector corresponding to the anisotropic conductive film. In such a constitution, corrosion of the metal wiring can be suppressed, but this brings about a disadvantage that checking after connection with the tape-carrier package by using the terminal portion is impossible.

Referring now to FIG. 3, an actual active matrix substrate according to a first embodiment of the present invention has several hundreds of terminals arranged in parallel with each other along a peripheral portion 100 of a substrate 1. However, only terminal 100 of the terminals will be explained in this embodiment. Since the feature of the structure of this embodiment will be best understood by the production method, explanations will be made to the method of manufacturing the active matrix substrate of this embodiment.

Figure 3A:
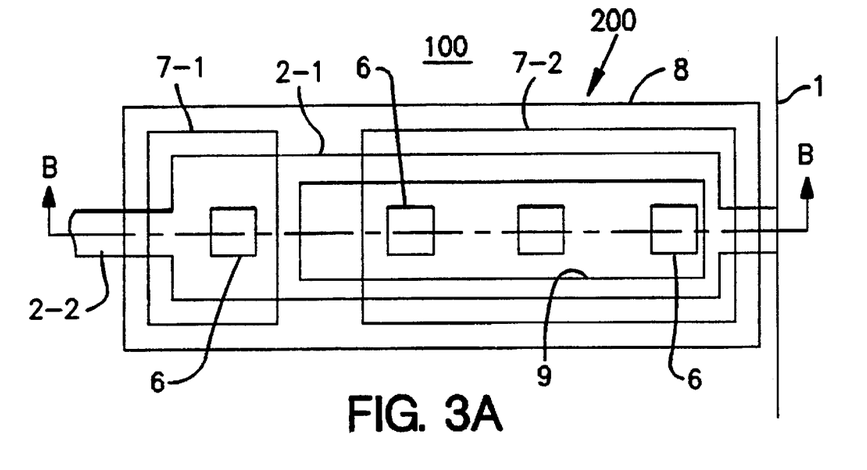
FIG. 3(a) is a plan view for a terminal portion of a first embodiment according to the present invention.
Figure 3B:
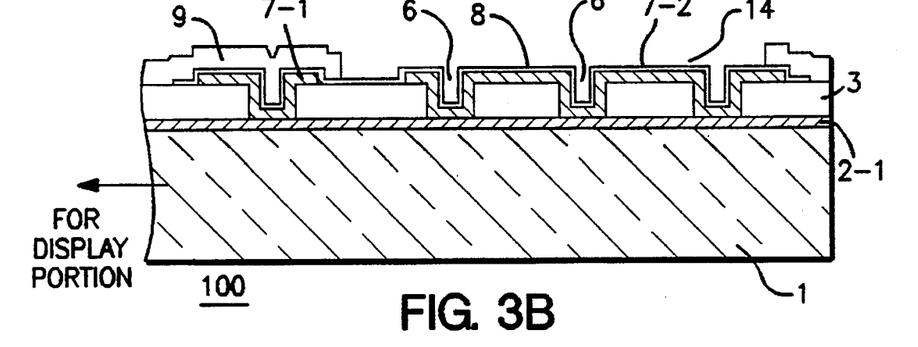
FIG. 3(b) is a cross sectional view taken along line B—B in FIG. 3(a)
Figure 3C:
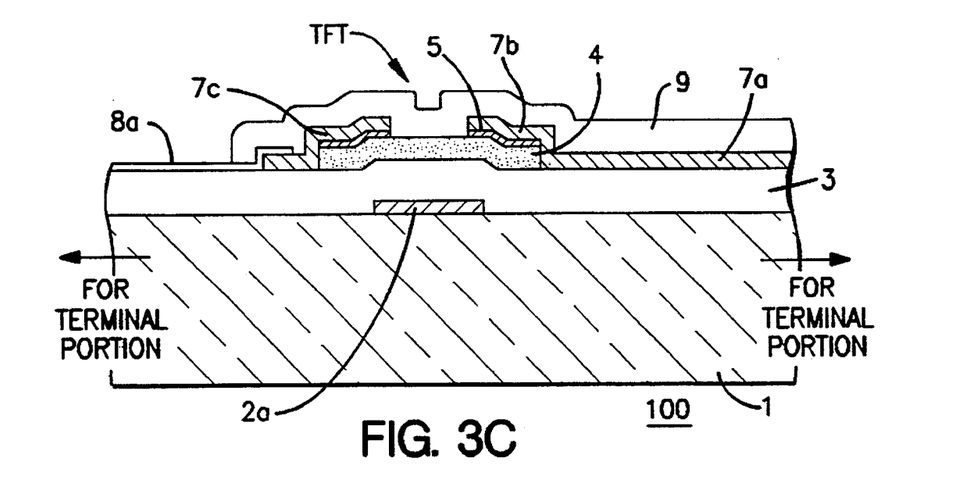
FIG. 3(c) is a cross sectional view for a display portion of an active matrix substrate.

A chromium (Cr) film as an opaque conductive film is deposited to a film thickness of 140 nanometer on the entire surface of a glass substrate 1 by a sputtering process, followed by being patterned to form a lower layer metal wiring 2-1 for the terminal, as shown in FIG. 3(a). This lower metal wiring forms a gate electrode 2a for a thin film transistor located in a central portion of a substrate 1 as shown in FIG. 3(c). Also by the lower layer metal wiring, a lead wiring 2—2 is formed to connect the terminal metal film 2-1 to the gate electrode 2a, as shown in FIG. 3(a) and FIG. 3(b).

Then, a composite film of a silicon oxide film and a silicon nitride film to form an interlayer insulating film 3 is formed to a film thickness in total of 500 nanometer so as to cover the glass substrate 1, the lower layer metal wiring 2 and the gate electrode 2a by a plasma enhanced CVD method. Successively, amorphous silicon films are deposited on the interlayer insulating film 3 in identical CVD apparatus in order. The amorphous films are a non-doped amorphous silicon film 4 and an $N^+$ type amorphous silicon film 5 to 200 nanometer and 50 nanometer thickness, respectively. Then, the amorphous silicon films 4, 5 are patterned so as to be left in an island shape to a thin film transistor forming portion located in the central portion of the substrate 1. A part of the amorphous silicon film 4 left in the island shape functions as a channel region of the thin film transistor. The interlayer insulating film 3 below the amorphous silicon film 4 left in the island shape functions as a gate insulating film of the thin film transistor. Successively, the interlayer insulation film 3 is patterned to form through holes at connection positions between the lower layer metal wiring 2 and upper layer metal wiring in the terminal portion as shown in FIG. 3(b). In this embodiment, through holes are formed at four positions of the terminal portion to expose surfaces of the lower layer metal wiring 2, respectively.

Then, another chromium (Cr) film as opaque conductive film is deposited to a film thickness of 140 nanometer so as to cover the interlayer insulation film 3 and the amorphous silicon films 4, 5 at the thin film transistor-forming portion, and so as to cover the interlayer insulation film 3 and the lower layer metal wiring 2 exposed through the contact holes 6 at the terminal portion. The film is patterned to form upper layer metal wirings 7-1 and 7-2 connected electrically with the lower layer metal wiring 2 in the contact holes 6 in the terminal portion, respectively.

The upper layer metal wirings 7-1 and 7-2 are formed, as shown in FIG. 3(a), into island shapes, respectively, and are located over the lower layer wiring 2 in the terminal portion. That is, the upper layer metal wiring 7-1 and the upper layer metal wiring 7-2 are connected to the lower layer metal wiring 2 by way of different contact holes 6, respectively. However, they are separated from each other on the interlayer insulation film 3 between the through holes 6. That is, in accordance with the present invention, a portion of the upper layer metal wiring is removed on the interlayer insulating film 3 between the through holes 6. In this patterning step, a drain electrode 7b and a source electrode 7c connected with the amorphous silicon films 4, 5, respectively, are formed in the thin film transistor-forming portion as shown in FIG. 3(c). Simultaneously, a data signal wiring 7a contiguous with the drain electrode 7b is formed to a display section other than the transistor-forming portion.

Then, an Indium-Tin-Oxide (ITO) film as a transparent film is formed an exposed entire surfaces to a thickness of 40 nanometer as the transparent conductive film 8 by a sputtering method. The film is patterned to cover the interlayer insulating film 3 and the upper layer metal wirings 7-1 and 7-2 in the terminal portion and so as to form a pixel electrode 8a connected with the source electrode 7c in the display portion. Finally, a silicon nitride film of about 200 nanometer thickness covering both the transistor-forming portion and the terminal portion is deposited by a plasma enhanced CVD method, to form a protective insulating film 9. Further, an opening portion 14 is formed in the protective insulating film 9 as shown in FIG. 3(b). The opening portion 14 exposes the transparent conductive film 8 at a portion formed on the surface of the interlayer insulating film 3 and the surface of the transparent conductive film 8 at a portion formed to the surface of the upper layer metal wiring 7-2 in the terminal portion. An opening portion is simultaneously formed in the protective insulating film 9 in the display portion for exposing the surface of the pixel electrode 8a. Through these processes, the manufacture of the active matrix substrate 8 is completed in this embodiment.

Then, subsequent assembling steps for the liquid crystal display device will be explained with reference to FIG. 3(d). The active matrix substrate 100 manufactured as described above is fitted to a color filter substrate 200 while keeping a narrow gas therebetween. A liquid crystal panel is completed by injecting and sealing liquid crystal material in the gap. Then, a tape-carrier package 300 as a driver IC for the liquid crystal panel is connected to the panel by using a connection member. In this embodiment, both of them are connected by using an anisotropic conductive film 10 as an example of the connection member.

Figure 3D:
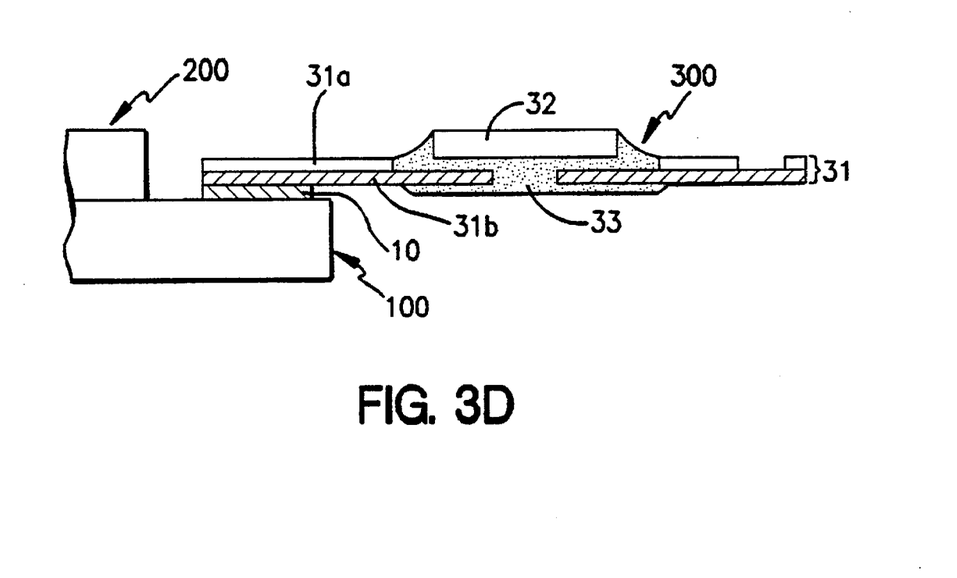
FIG. 3(d) is a cross sectional view for explaining a schematic connection state between an active matrix substrate and a tape-carrier package.

In the tape-carrier package 300, a driver IC die 32 is mounted on a flexible wiring substrate 31 comprising a plurality of copper foil wirings 31b formed on a flexible insulating film 31a and connected to each of a plurality of the copper foil wirings 31b, in which major portion of the IC die is covered with a potting resin as shown in FIG. 3(d).

The tape-carrier package 300 is connected to the active matrix substrate 100 by at first provisionally bonding the anisotropic conductive film 10 on a terminal portion on the active matrix substrate 100 under selected temperature and pressure. The anisotropic conductive film 10 comprises conductive particles dispersed in a thermosetting resin. The provisional bonding is conducted, for example, by pressing the anisotropic conductive film 10 by way of a separator to the terminal portions of the active matrix substrate 100 under the conditions at a temperature of 80° C., for a period of 3 sec. and at a pressure of 5 kg/cm². After the provisional bonding, the separator adhered on the surface of the anisotropic conductive film 10 is peeled off. Further, the flexible wiring substrate 31 of the tape-carrier package 300 is disposed on the provisionally bonded anisotropic conductive film 10 and then press-bonded under heating to electrically connect the copper foil wirings 31b to the terminal portions of the liquid crystals, respectively. The bonding is conducted under the conditions, for example, at a temperature of 180° C., for a period of 18 sec. and under a pressure of 30 kg/cm². In this case, the resin of the anisotropic conductive film 10 is fluidized to cover in an intimate contact with the surface of the terminal portion. The other connection portion of the tape-carrier package 300 is connected to a rigid wiring substrate. For example, a power supply circuit is disposed to the rigid substrate for supplying a power source voltage to the tape-carrier package 300 and the active matrix substrate 100. Further, the wiring substrate receives video signals decomposed into matrix signals in accordance with the display information of the liquid crystal panel and controls the driver IC 32 of the tape-carrier package 300.

Figure 3E:
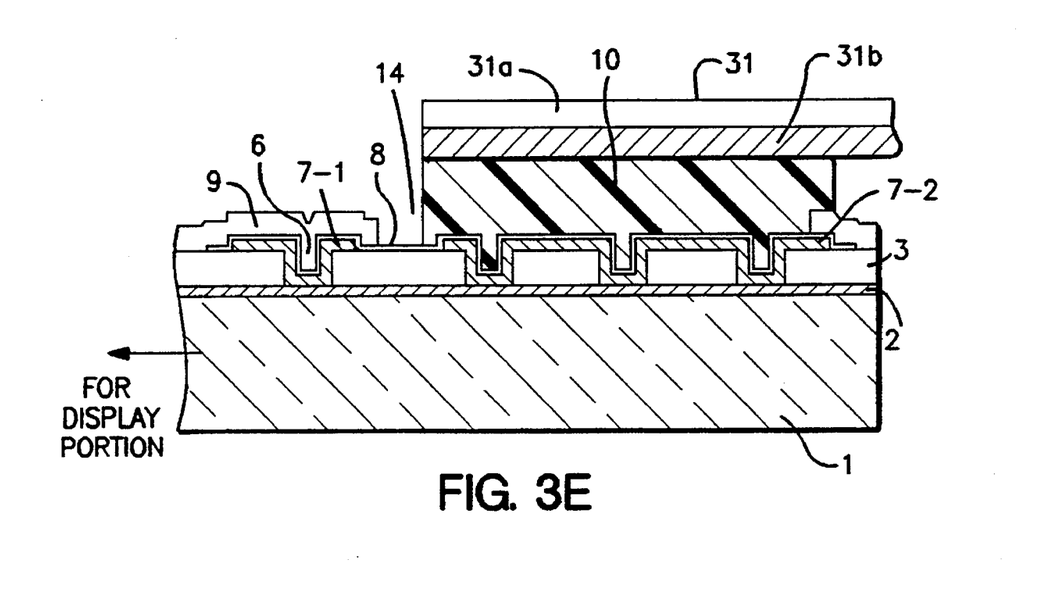
FIG. 3(e) is a cross sectional view for explaining a connection state with a tape-carrier package in a terminal portion of an embodiment according to the present invention.

The tape-carrier package is connected to the terminal portion on the active matrix substrate 100 in this embodiment as shown specifically in the cross section of FIG. 3(e). In the terminal portion, the upper layer metal wiring 7 is eliminated at a portion not covered by the protective insulation film 9 or the anisotropic conductive film 10. In other words, in the terminal portion, the upper layer metal wiring 7-1 is protected by double coverage with the transparent conductive film 8 and the protective insulation film 9, and the upper layer metal wiring 7-2 is protected at least by double coverage with the transparent conductive film 8 and the anisotropic conductive film 10. The upper layer wiring 7-2 is further protected, locally, by coverage also with the protective insulation film 9. Accordingly, even if the transparent conductive film 8 in the terminal portion contains a defect, or even if it is used in a high humidity atmosphere, the upper layer metal wirings 7-1 and 7-2 are not exposed to the external air and protected against corrosion. In addition, the transparent conductive film 8 is formed directly on the surface of the interlayer insulation film 3 between the upper layer metal wiring 7-1 and the upper layer metal wiring 7-2 and is exposed within the opening 14 of the protective insulation film 9. By applying a measuring probe to that part of the transparent conductive film 8, it can be checked whether the tape-carrier package 300 and the active matrix substrate 100 are electrically connected as desired or not, and it can be used as a checking terminal. That is, in this embodiment, it can be used as the checking terminal while preventing corrosion of the upper layer metal wirings 7-1 and 7-2 in the terminal portion.

If it is found upon checking that no sufficient electric connection is obtained between both of them, the tape-carrier package 300 connected by way of the anisotropic conductive film 10 in the terminal portion is peeled off from the active matrix substrate 100 and then bonded again as repairing operation. In the peeling step, not only the anisotropic conductive film 10 but also the underlying transparent conductive film 8 and the upper layer metal wiring 7-2 may also be peeled together sometimes from the active matrix substrate 100. In this embodiment, not only the upper layer metal wiring 7-2 but also the upper layer metal wiring 7-1 are also formed and they are connected respectively by way of the through holes 6 to the lower layer metal wiring 2. Accordingly, if the copper foil wirings 31b of the tape-carrier package 300 and the transparent conductive film 8 in the terminal portion of the active matrix substrate 100 are connected again by a new anisotropic conductive film 10 upon repairing operation, a conduction path connected by way of the upper layer metal wiring 7-1 to the lower layer metal wiring 2 can be ensured at least in the same manner as that before the repairing operation and a region usable as the checking terminal can be maintained.

Further, in this embodiment, the upper layer metal wiring 7-2 is connected by way of the through holes 6 at three positions to the lower layer metal wiring 2, while the upper layer metal wiring 7-1 connected by way of the transparent conductive film 8 to the upper layer metal wiring 7-2 is connected to the lower layer metal wiring 2 by way of the through hole 6 at one position, respectively. That is, the upper layer metal wirings 7-1 and 7-2 are electrically connected with the lower layer metal wiring 2 by way of the through holes 6 at several positions. In the structure connected with the through holes disposed at several positions, the upper layer metal wiring is fastened to the lower layer metal wiring and can be made less peeling as compared with the structure connected by way of a single and a large diameter size through hole. Namely, also after the peeling step after the checking, the upper layer metal wiring 7-2 can be made less peeling from the active matrix substrate 100. Further, since the peripheral length for the opening portion of the through holes is made longer, the upper layer metal wiring is less disconnected in the through holes thereby enabling to provide more reliable connection between the upper layer metal wiring and the lower layer metal wiring.

Further, since the transparent conductive film 8 and the lower layer metal wiring 2 are connected by way of the upper layer metal wirings 7-1 and 7-2, the upper layer metal wiring has a resistance value lower by about two digits as compared with ITO as the transparent conductive film 8, so that the resistance value can be lowered further. Further, since the upper layer metal wirings 7-1 and 7-2 are formed at the same time with the source electrode 7c, the drain electrode 7b and the data signal wiring 7a of the thin film transistor portion, no additional step is required for lowering the resistance value.

Figure 4A:
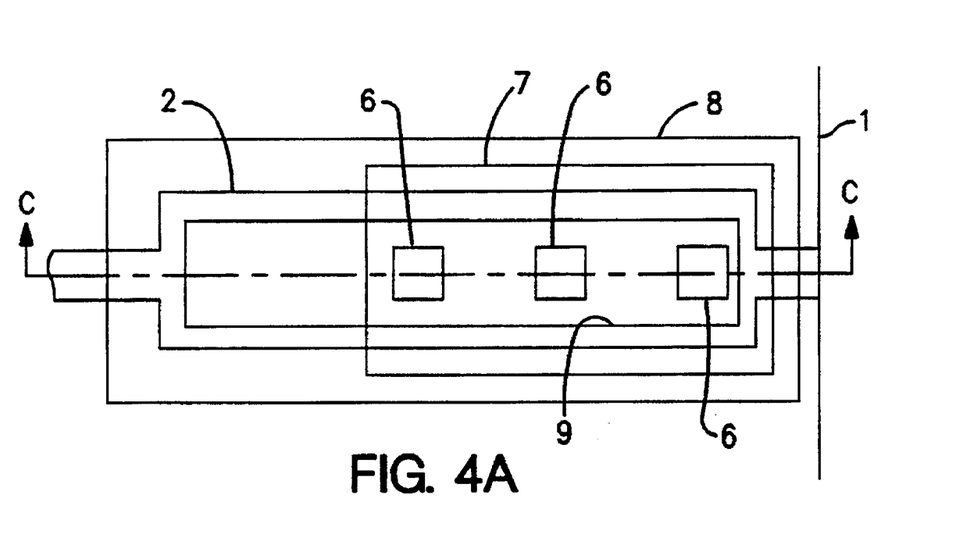
FIG. 4(a) is a plan view for a terminal portion of a second embodiment according to the present invention.
Figure 4B:
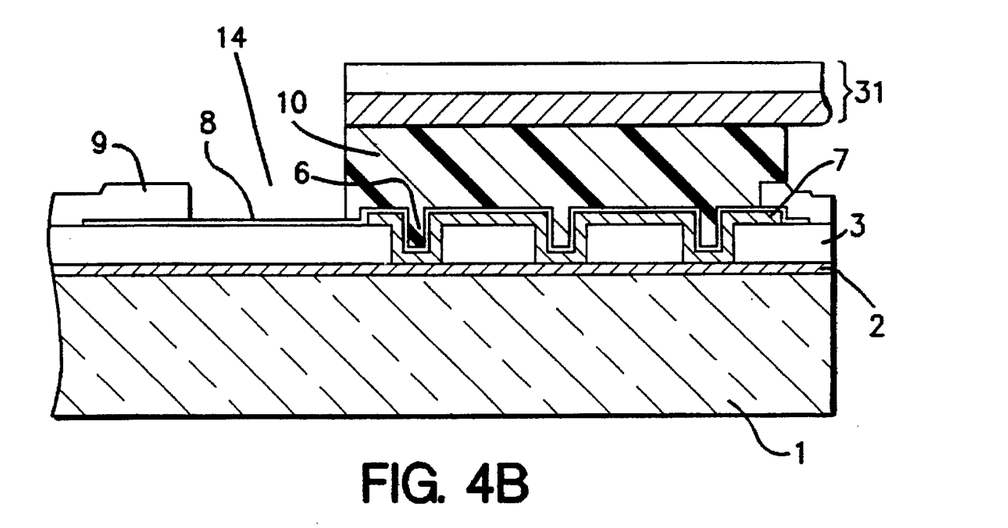
FIG. 4(b) is a cross sectional view taken along line C—C in FIG. 4(a) for explaining a connection state with a tape-carrier package in a terminal portion of a second embodiment according to the present invention.

Referring to FIG. 4(a) and FIG. 4(b), a second embodiment according to the present invention will be explained more specifically. FIG. 4(a) shows a terminal portion before forming an anisotropic conductive film 10. FIG. 4(b) shows a cross sectional view of a structure in which a flexible wiring substrate 31 is connected by way of the anisotropic conductive film 10. Identical portions with those in the first embodiment described above carry the same reference numerals for which duplicate explanation will be omitted. In this embodiment, an upper layer metal wiring 7 is electrically connected to a lower layer metal wiring 2 via three through holes 6. The upper layer metal wiring 7 is present only at a portion to which the anisotropic conductive film as an example of a connection member is press bonded. That is, the upper layer metal wiring 7 is protected at least by double coverage with a transparent conductive film 8 and the anisotropic conductive film 10 and further protected, locally, by coverage with a protective insulation film 9. The transparent conductive film 8 not covered with the anisotropic conductive film 10 and exposed through an apertured portion of the protective insulation film 9 can be used as a checking terminal. Also in this embodiment, the transparent conductive film 8 exposed through the apertured portion of the protective insulation film 9 is formed directly on the surface of the interlayer insulating film 3 under which the upper layer metal wiring 7 is not present in the same manner as in the first embodiment. Accordingly, even if the transparent conductive film 8 in the terminal portion contains a defect or it is used in a high humidity atmosphere, the metal wiring 7 is not exposed to the external atmospheric and can be protected against corrosion. In addition, by applying a measuring probe to the transparent conductive film at the portion exposed in the aperture, it can be checked as to whether the tape-carrier package 300 and the active matrix substrate 100 are connected electrically as desired and it can be used as the checking terminal. That is, also in this embodiment, it can be used as the checking terminal while preventing corrosion of the upper layer metal wiring 7 in the terminal portion. Further, according to this embodiment, since the metal wiring in the terminal portion near the display portion is protected by the metal wiring 9, the transparent conductive film 9 and the interlayer insulation film 3, the corrosion resistance is further improved as compared with the first embodiment.

Figure 5A:
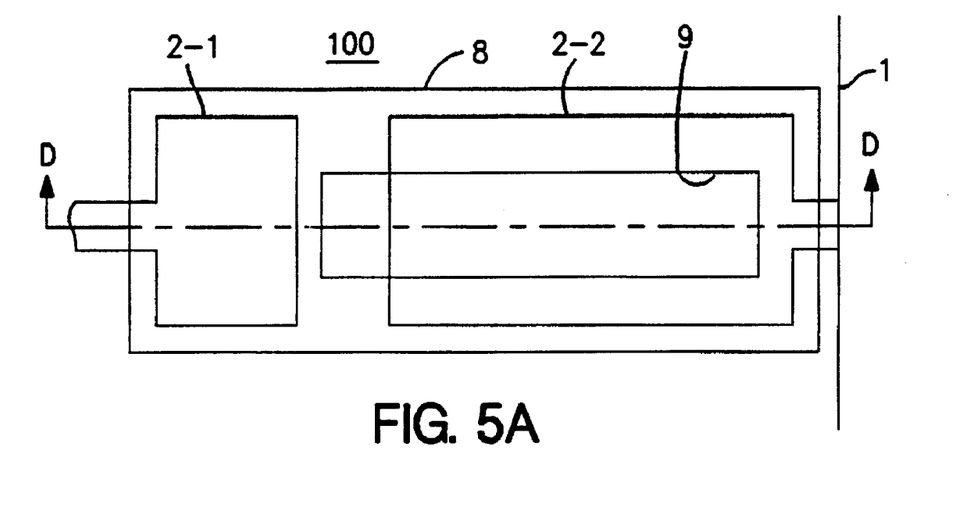
FIG. 5(a) is a plan view for a terminal portion of a third embodiment according to the present invention.
Figure 5B:
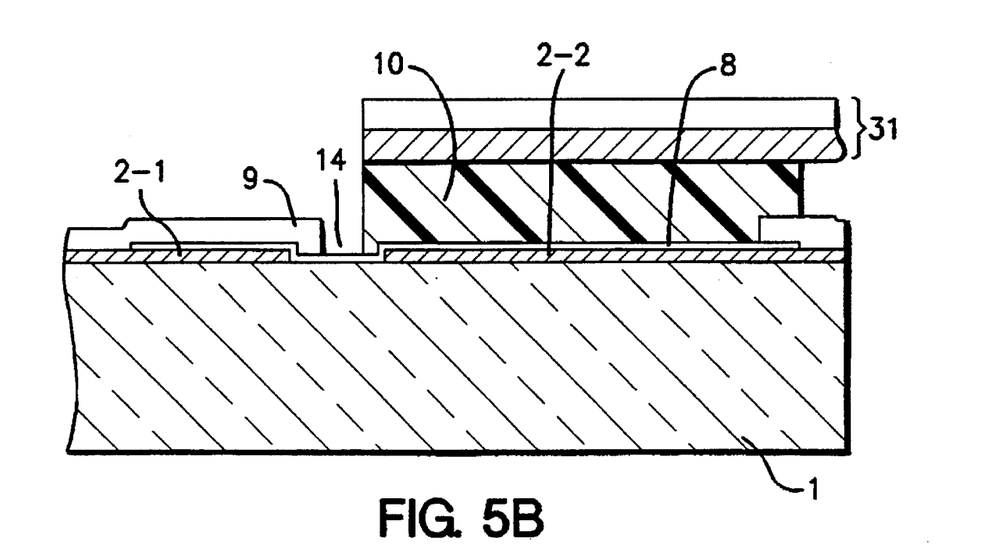
FIG. 5(b) is a cross sectional view taken along line D—D in FIG. 5(a) for explaining a connection state with a tape-carrier package in a terminal portion of the third embodiment according to the present invention.

Referring to FIG. 5(a) and FIG. 5(b), a third embodiment according to the present invention will be explained more specifically. Identical portions with those of the first and the second embodiments carry the same reference numerals for which duplicate will be omitted. In the previous first and second embodiments, the transparent conductive layer 8 is formed to the upper layer of the upper layer metal wiring 7. In a case of manufacturing an active matrix substrate, a process of forming an upper layer metal wiring to the upper layer of the transparent conductive film is sometimes employed. In this case, the active matrix substrate is manufactured through manufacturing steps of a gate wiring patterning step, an insulating film and an amorphous silicon film forming step, a through hole forming step, a pixel forming step, a drain wiring forming step, a channel etching step and a protective film forming step in this order. In this case, the upper layer metal wiring is also formed by patterning in the terminal portion in the drain wiring forming step. The transparent conductive film is also formed by patterning to the terminal portion in the pixel forming step. In this embodiment, the terminal portion comprises a dual layer film of the lower layer metal wiring 2-1 and the lower metal layer metal wiring 2—2, and the transparent conductive film 8. That is, the island shape transparent conductive film 8 covers the lower layer metal wirings 2-1 and 2—2 as shown in FIG. 5(a), and the glass substrate 8 situating between the lower layer metal wirings, and electrically connects the lower layer metal wirings 2-1 and 2—2 separated from each other. The lower layer electrode wiring 2-1 is protected by double coverage with the transparent conductive film 8 and the protective insulation film 9. The lower layer electrode wiring 2—2 is protected by double coverage with the transparent conductive film 8 and the anisotropic conductive film 10 and also protected, locally, by coverage with the protective insulation film 9. Also in this embodiment, since the transparent conductive film 8 exposed in the apertured portion of the protective insulation film 9 is formed directly on the surface of the glass substrate 1, under which the metal wiring is not present, if the transparent conductive film 8 in the terminal portion contains a defect or it is used in a high humidity atmosphere, the lower layer metal wirings 2-1 and 2—2 are not exposed to the external atmosphere and can be protected against corrosion. In addition, by applying a measuring probe to a portion of the transparent conductive film 8 exposed in the aperture, it can be checked as to whether the tape-carrier package 300 and the active matrix substrate 100 are connected electrically as desired and it can be used as the checking terminal. That is, in this embodiment, it can be used also as the checking terminal while preventing the corrosion of the lower metal wirings 2-1 and 2—2 in the terminal portion.

While the present invention has been explained with reference to the preferred embodiments, the invention is not restricted only to such embodiments but various modifications are possible within a range not departing the purport of the present invention. For instance, the lower layer metal wiring and the upper layer metal wiring are made of Cr but, instead, a single layer or a composite layer such as made of Al, Ta, Mo or W may be used. Further, the materials for the lower layer metal wiring and the upper layer metal wiring may not always be identical. Furthermore, also the interlayer insulating film or the protective insulation film may be constituted with the materials other than those described in the previous embodiments.

Furthermore, the connection member used for the terminal portion is not restricted only to the anisotropic conductive film. For instance, a heat seal connector can be used as the connection member. A specific example is a flexible tape-shaped material in which linear silver conductors are embedded in a resin layer such as made of polyimide each at a distance equal with that for each of the terminal portions of the active matrix substrate 100 and, in which a driver IC is connected to a side opposite to the side to be connected with each of the terminal portions of the substrate 100. The portion of the linear silver conductors excepting for the portions to be connected with each of the terminal portions of the active matrix substrate 100 is covered with a heat sensitive adhesive. Each of the terminal portions of the substrate 100 and each of the silver conductors of the heat seal connector may be aligned and heated under pressure.

What is claimed is:

1. A liquid crystal display apparatus having a plurality of terminals receiving driving signals, each of said terminals comprising a first conductor film, a transparent conductive film having a first portion formed on said first conductor film and a second portion extending from said first portion, a protective insulating film covering a part of said second portion of said transparent conductive film while leaving a remaining part of said second portion uncovered, said remaining part of said second portion of said transparent conductive film being isolated from said first conductor film, and a connection member connected to said first portion of said transparent conductive film.

2. The apparatus as claimed in claim 1, wherein each of said terminals further comprises a second conductor film and an interlayer insulating film covering said first conductor film, said interlayer insulating film having at least one contact hole exposing a part of said first conductor film, said second conductor film being formed on said interlayer insulating film in contact with said part of said first conductor film through said contact hole, said second portion of said transparent conductive film being extended on said interlayer insulating film from said first portion.

3. The apparatus as claimed in claim 2, wherein each of said first and second conductor films is made of a material selected from the group consisting of Cr, Al, Ta, Mo and W.

4. A liquid crystal display apparatus comprising an insulating substrate, a display portion formed on said insulating substrate, and a plurality of terminals formed on said insulating substrate to receive driving signals and supply to said driving signals to said display portion, each of said terminals including a first conductor film formed on said insulating substrate, an interlayer insulating film formed on said first conductor film, a through hole formed in said interlayer insulating film to expose a part of said first conductor film, a second conductor film formed on said interlayer insulating film in contact with said part of said first conductor film through said through, a transparent conductive film formed on said second conductor film and elongated on said interlayer insulating film to form an elongated portion, a protective insulating film covering said elongated portion of said transparent conductive film, and an opening formed in said protective insulating film to expose a part of said elongated portion of said transparent conductive film such that said part of said elongated portion of said transparent conductor film is isolated from said second conductor film.

5. The apparatus as claimed in claim 4, wherein said insulating substrate is a glass substrate, and said display portion includes a plurality of switching transistors, said first conductor film being connected to an associated one of said switching transistors.

6. The apparatus as claimed in claim 4, said transparent conductive film is attached to a connecting member while exposing said part of said elongated portion of said transparent conductive film, said connecting member transferring said driving signals from a driver.

7. The apparatus as claimed in claim 6, wherein said connecting member is made of one of an anisotropic conductive film and a heat seal connector.

8. The apparatus as claimed in claim 4, wherein each of said terminals further includes an additional through hole formed in said interlayer insulating film to expose an additional part of said first conductor film and a third conductor film formed on said interlayer insulating film apart from said second conductor film in contact with said additional part of said first conductor film via said additional through hole, and said elongated portion of said transparent conductive film being formed on said third conductive film.

9. The apparatus as claimed in claim 8, wherein said transparent conductive film is attached to a connecting member while exposing said part of said elongated portion, said connecting member transferring said driving signals from a driver.

10. The apparatus as claimed in claim 9, wherein said connecting member is made of one of an anisotropic conductive film and a heat seal connector.

11. An active matrix substrate comprising: an insulating substrate, a display portion formed on said insulating substrate and having a pixel electrode to indicate information and a switching element, and a terminal portion formed on said insulating conductive substrate supplied with a control signal relating to said information;

said terminal portion further comprising a metal wiring formed on said insulating substrate, said metal wiring having discontiguous first and second portions, a transparent conductive film formed on said first and second portion of said metal wiring and directly covering said insulating substrate between said first and second portion of said metal wiring, and protective insulating film covering a first portion of said transparent conductive film and said transparent insulating substrate and having an opening portion exposing a second portion of said transparent conductive film directly covering said transparent insulating substrate and a third portion of said transparent conductive film covering said second portion of said metal wiring.

12. The active matrix substrate as claimed in claim 11, wherein said insulating substrate is a glass substrate, said switching element is a transistor, and said metal wiring is connected to one of a gate and a drain of said transistor.

13. The active matrix substrate as claimed in claim 11, wherein said third portion of said transparent conductive film is covered with a connecting member to be supplied with said control signal from a driver integrated circuit.

14. The active matrix substrate as claimed in claim 13, wherein said connecting member is made of one of an anisotropic conductive film and a heat seal conductor.

* * * * *